May 5, 1970  D. A. AGABA  3,510,706
MAGNETIC SPINNING BODY APPARATUS
Filed Feb. 23, 1968

David A. Agaba
INVENTOR.

United States Patent Office 3,510,706
Patented May 5, 1970

3,510,706
MAGNETIC SPINNING BODY APPARATUS
David A. Agaba, 800 Borite Circle, Reno, Nev. 89502
Filed Feb. 23, 1968, Ser. No. 707,780
Int. Cl. H02k 49/10
U.S. Cl. 310—103                    3 Claims

ABSTRACT OF THE DISCLOSURE

A motor driven magnetic sun member is mounted within a housing and, through the magnetic field generated thereby, both spins carrier mounted planet members and orbits the members about a fixed path defined by the carrier. Each of the planet members includes magnets which cooperate with the magnets within the sun member in effecting the spinning and orbiting.

---

The instant invention generally relates to a device wherein magnetism is utilized in effecting movement, and is more directly related to a device wherein a central or sun member is power driven and utilized so as to effect movement of radially located members so as to produce an orbiting type effect.

It is a primary object of the instant invention to provide a device, equally adaptable for both education and entertainment purposes, wherein a plurality of bodies are orbited about a central axis and at the same time individually rotated about their own axes simulating, as an example, one or more moons, or for that matter flying saucers, moving in fixed paths about a planet-simulating globe. The desired movement is achieved through magnetism wherein a central power driven member includes bar magnets which cooperate with similar magnets provided in carrier mounted outer members capable of, through the carrier, orbiting about the central member and at the same time being rotatably mounted on the carrier for rotation about their individual axes.

Further, an important object of the instant invention resides in the provision of a movable, attention attracting device which, while unique, is of a relatively simple construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
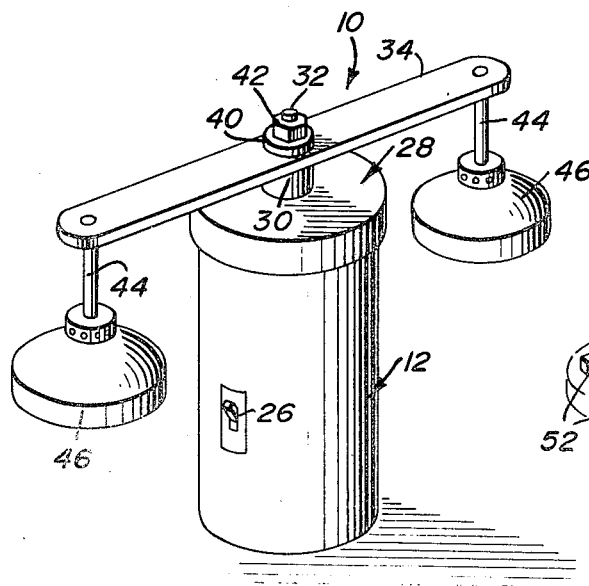
FIG. 1 is a perspective view of the device comprising the instant invention.
Figure 2:
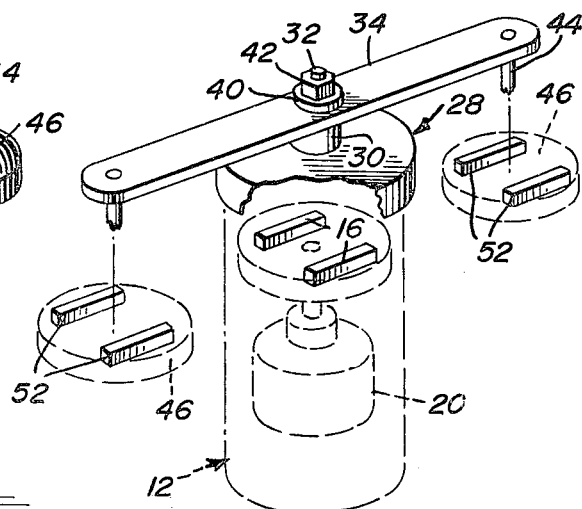
FIG. 2 is a perspective view of the device with portions illustrated in phantom lines so as to detail the movement inducing internal construction of the members.

Referring now more specifically to the drawings, reference numeral 10 is used to generally designate the device comprising the instant invention. This device 10 includes, within an appropriate non-magnetic housing 12, which may be in the nature of a globe or the like, a disc-like central or sun member 14.

Figure 3:
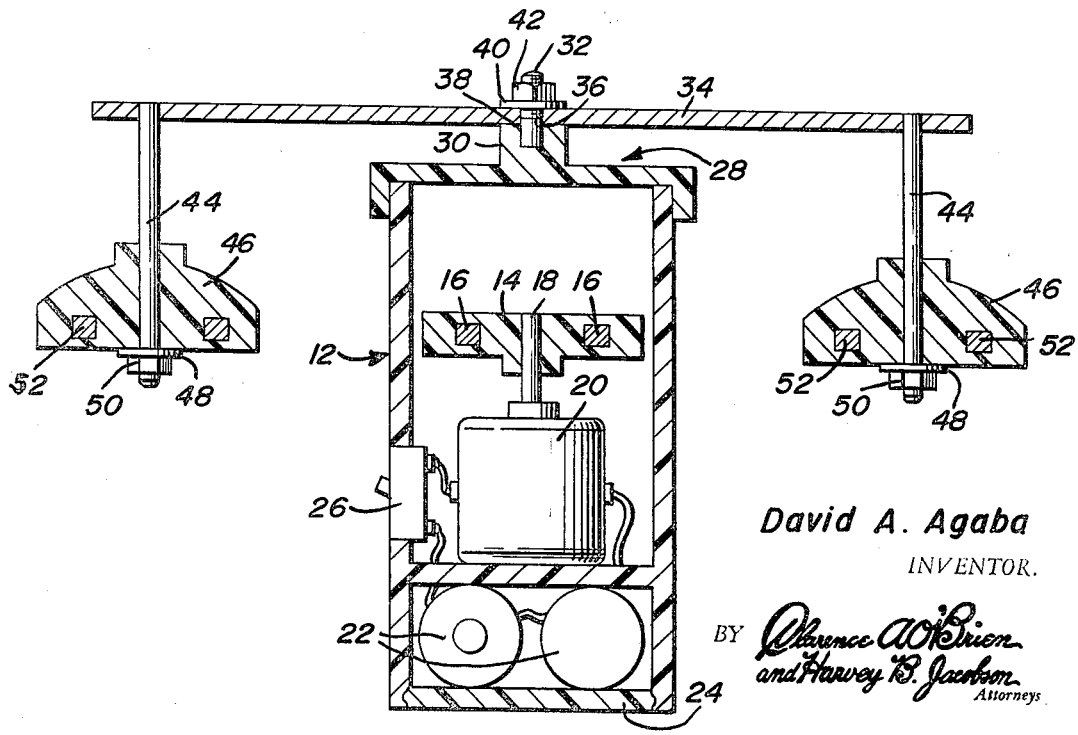
FIG. 3 is an enlarged cross-sectional view through the device.

The member 14 includes a pair of parallel laterally spaced north-south bar magnets 16, and is of an appropriate non-magnetic material, preferably plastic with the two magnets 16 embedded therein. This member 14 is rigidly affixed to the drive shaft 18 of an appropriate motor 20 for rotation of the member 14 in response to activation of the motor 20. It is contemplated that, in order that the device 10 be self-contained, an appropriate power source, for example the batteries 22, be provided within the housing 12 with the motor 20. Such batteries 22, as noted in FIG. 3, can be provided in a separate compartment beneath the motor 20 and introducible thereinto through an appropriate access panel, for example a removable bottom 24 on the housing 12. By the same token, an appropriate switch unit 26 can be provided so as to selectively energize the motor 20 and rotatably drive the sun member 14.

The top of the housing 12, which can be in the nature of a removable lid 28, includes a central projection or boss 30 which in turn has a vertically projecting threaded shaft or rod 32 projecting upwardly therefrom. An elongated carrier or carrier bar 34 is, through a central apertue 36 povided therein, rotatably received over the shaft 32 into seated engagement with an annular shoulder 38 defined by the upper end of the projection 30 peripherally about the shaft 32. An appropriate washer 40 and nut 42 are then positioned on the shaft 32 over the carrier 34, the nut 42 being threaded on the shaft 32 and adjustable so as to vary the clamping pressure, through the washer 40, on the carrier 34.

The opposite ends of the carrier 34 are each provided with a depending rod 44 rigid therewith and rotatably mounting an outer or planet member 46 at substantially an equal height with the central or sun member 14. Each of the planet members 46 is mounted on its associated rod 44 by a washer 48 received over the rod 44 below the member 46 and an appropriate nut 50 threaded on the threaded lower end of the rod 44. The planet members 46 are, similar to the sun member 14, also preferably formed of molded plastic with each planet member 46 having a pair of laterally spaced parallel north-south bar magnets 52 embedded therein. The outer bar magnets 52 are substantially coplanar with the inner bar magnets 16 and, while outwardly spaced therefrom, are within the field of influence thereof so as to move in response to movement of the central or sun member 14.

In actual operation, the motor 20 is energized so as to drive the sun member 14 in a first direction, for example counter-clockwise, and the planet members 46 manually spun in the opposite direction, in this instance clockwise, about their individual axes. Once started in this manner, the rotating sun member 14 will, through the magnetic coupling provided by the generated magnetic fields, maintain the planet members 46 spinning on their individual axes generally at the speed of the sun member, preferably at least 1200 r.p.m. In addition, the planet members 46, through the rotatably mounted carrier 34, will orbit about the housing 12 in the direction of rotation of the sun member 14. While the planet members 46 are to be freely rotatable upon their rods 44, if the carrier 34 were similarly freely rotatably supported, the orbital movement of the planet members 46 would ultimately approach the rotational speed of the sun member 14 which in turn would result in a halting of the spinning of the individual planet members 46. Accordingly, the mounting washer 40 and nut 42 are utilized in producing, in conjunction with the supporting annular shoulder 38, a frictional drag on the carrier 34 so as to in effect limit the orbital speed of the planet members 46, thereby ensuring a continued operation of the device in the desired manner, that is with the individual planet members 46 both rotating and orbiting.

While two planet members have been illustrated, it will be appreciated that, through an appropriate carrier, any reasonable number of planet members, from one up, can be utilized. Further the housing as well as the planet members can be provided with any appropriate external appearance and in any position so as to produce whatever special effects might be desired for both education and entertainment purposes, the device, in all instances, being of an attention attracting nature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spinning body device comprising a central member, magnet means constituting a portion of said central member, power means drivingly engaged with said central member for a selective rotational driving thereof, a pair of spaced outer members generally coplanar with and radially outward from said central member, magnetic means constituting a portion of said outer members, carrier means mounting said outer members for orbital movement of said outer members about said central member through magnetic forces generated by said magnetic means upon a rotational driving of said central member, means rotatably mounting said outer members on said carrier means, said carrier means comprising an elongated carrier bar, the means rotatably mounting the outer members comprising elongated rods rigid with and depending from the outer end portions of said carrier bar, and a non-magnetic housing surrounding said central member, a projecting portion on said housing defining a seat for the carrier bar, a mounting shaft projecting outwardly of said projecting portion, said carrier bar including an aperture therethrough receiving said mounting shaft for rotation of said carrier bar thereabout, and means adjustably mounted on said mounting shaft for providing a variable clamping force on said carrier bar so as to provide a variable frictional drag on said carrier bar whereby a variation in the rate of rotation of the carrier bar can be achieved.

2. A spinning body device comprising a central member, magnet means constituting a portion of said central member, power means drivingly engaged with said central member for a selective rotational driving thereof, at least one outer member generally coplanar with and radially outward from said central member, magnetic means constituting a portion of said outer member, carrier means mounting said outer member for orbital movement of said outer member about said central member through magnetic forces generated by said magnet means upon a rotational driving of said central member, means rotatably mounting said outer member on said carrier means, said carrier means comprising an elongated carrier bar, the means rotatably mounting the outer member comprising an elongated rod rigid with and depending from an outer end portion of said carrier bar, and means adjustably engaged with said carrier bar for providing a variable frictional drag to vary the speed of rotation of said bar.

3. A spinning body device comprising a housing, an elongated carrier bar extending transversely across said housing, means rotatably mounting said carrier bar on said housing, a pair of depending shafts on the outer ends of said carrier bar, a planet member rotatably mounted on each shaft, each planet member including magnet means, a sun member rotatably mounted within said housing in a common plane with said planet members, said sun member including magnet means, means for power driving said sun member, the field of force of the magnet means of said sun member overlapping the field of force of the magnet means of each planet member whereby a rotational driving of said sun member will produce a rotational and orbital driving of said planet members, and means for providing a variable frictional drag on said carrier bar.

References Cited

UNITED STATES PATENTS 19,392    2/1858    Wetmore _____ 35—45

FOREIGN PATENTS 1,440,471    4/1966    France.

DAVID X. SLINEY, Primary Examiner